(12) United States Patent
Melin et al.

(10) Patent No.: US 9,194,113 B1
(45) Date of Patent: *Nov. 24, 2015

(54) SINK DISPOSAL AND METAL SENSOR

(71) Applicant: SAMELIN INNOVATIONS, LLC, Wilmington, NC (US)

(72) Inventors: Samantha Erica Melin, Wilmington, NC (US); Thomas Eric Melin, Wilmington, NC (US); Juan Carlos Perez, Charlotte, NC (US); Raeshon Lamont McNeil, Charlotte, NC (US); Michael Starkey, Charlotte, NC (US)

(73) Assignee: SAMELIN INNOVATIONS, LLC, Wilmington, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,657

(22) Filed: Sep. 12, 2014

Related U.S. Application Data

(63) Continuation-in-part of application No. 14/294,120, filed on Jun. 2, 2014, now abandoned, which is a continuation of application No. 13/843,231, filed on Mar. 15, 2013, now Pat. No. 8,740,115.

(60) Provisional application No. 61/637,270, filed on Apr. 23, 2012, provisional application No. 62/036,108, filed on Aug. 11, 2014.

(51) Int. Cl.
*B02C 23/36* (2006.01)
*E03C 1/266* (2006.01)
*G01V 3/10* (2006.01)
*B02C 18/00* (2006.01)
*B02C 25/00* (2006.01)

(52) U.S. Cl.
CPC ........... *E03C 1/2665* (2013.01); *B02C 18/0084* (2013.01); *B02C 18/0092* (2013.01); *B02C 25/00* (2013.01); *G01V 3/10* (2013.01)

(58) Field of Classification Search
CPC .. B02C 25/00; B02C 18/0092; B02C 18/0084
USPC ................. 241/36, 46.013–46.015, 101.3
See application file for complete search history.

(56) References Cited

U.S. PATENT DOCUMENTS

| 4,089,474 A | 5/1978 | Timmer |
| 4,216,916 A | 8/1980 | Tupper |
| 4,253,616 A | 3/1981 | Timmer |

(Continued)

FOREIGN PATENT DOCUMENTS

JP 8168686 A 7/1996

OTHER PUBLICATIONS

Emily Boemer, Everything but the Kitchen Sink, Inventors Digest, Sep. 2014, pp. 17-21, vol. 30—issue 9, Inventors Digest LLC, Charlotte NC.

*Primary Examiner* — Faye Francis
(74) *Attorney, Agent, or Firm* — Tillman Wright, PLLC; Chad D. Tillman; Jeremy C. Doerre

(57) ABSTRACT

An apparatus includes: a disposal unit; a control unit configured to stop operation of the disposal unit; and a metal detector coil and associated circuitry, the metal detector coil located such that waste passing into the disposal unit for shredding passes through the metal detector coil. The control unit is triggered to stop operation of the disposal unit upon the detection of metal passing through the metal detector coil.

20 Claims, 9 Drawing Sheets

(56) References Cited

U.S. PATENT DOCUMENTS

| | | |
|---|---|---|
| 4,742,339 A | 5/1988 | Baziuk |
| 5,318,229 A | 6/1994 | Brown |
| 5,576,621 A | 11/1996 | Clements |
| 5,610,516 A | 3/1997 | Maier |
| 6,618,873 B2 | 9/2003 | Mulgrew et al. |
| 6,636,135 B1 | 10/2003 | Vetter |
| 7,066,415 B2 | 6/2006 | Strutz |
| 7,163,164 B2 | 1/2007 | Diaz |
| 7,296,683 B1 | 11/2007 | Vallelonga, Sr. et al. |
| 7,533,835 B2 | 5/2009 | Hanson |
| 7,936,242 B2 | 5/2011 | Carpenter |
| 7,967,225 B1 | 6/2011 | Schulz |
| 8,322,641 B2 | 12/2012 | Jeon |
| 8,584,976 B1 | 11/2013 | Melin et al. |
| 8,740,115 B1 | 6/2014 | Melin et al. |
| 2004/0000904 A1 | 1/2004 | Cotter |
| 2007/0181718 A1 | 8/2007 | Hanson |
| 2010/0133370 A1 | 6/2010 | Flynn |
| 2013/0112791 A1 | 5/2013 | Jeon |
| 2013/0175373 A1 | 7/2013 | Morgan et al. |
| 2013/0186573 A1 | 7/2013 | Kulesa et al. |

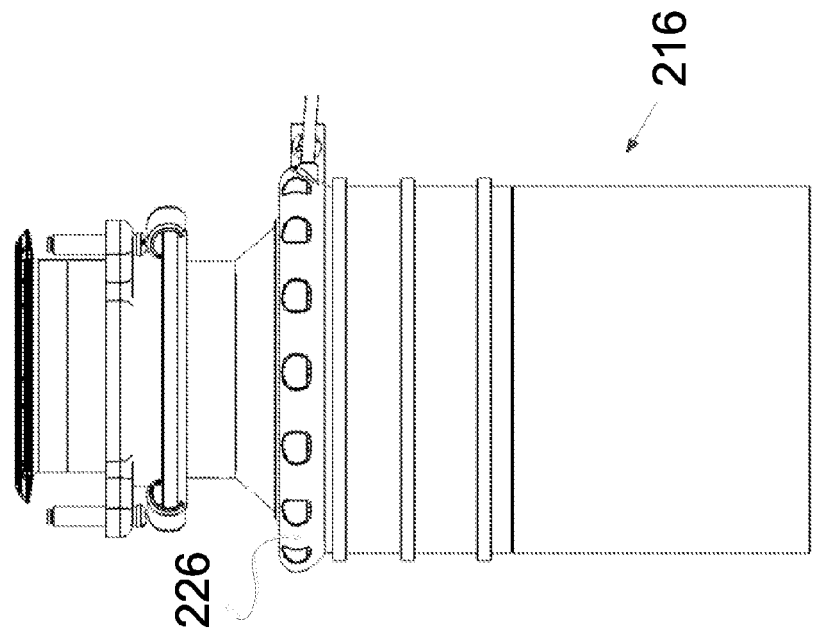
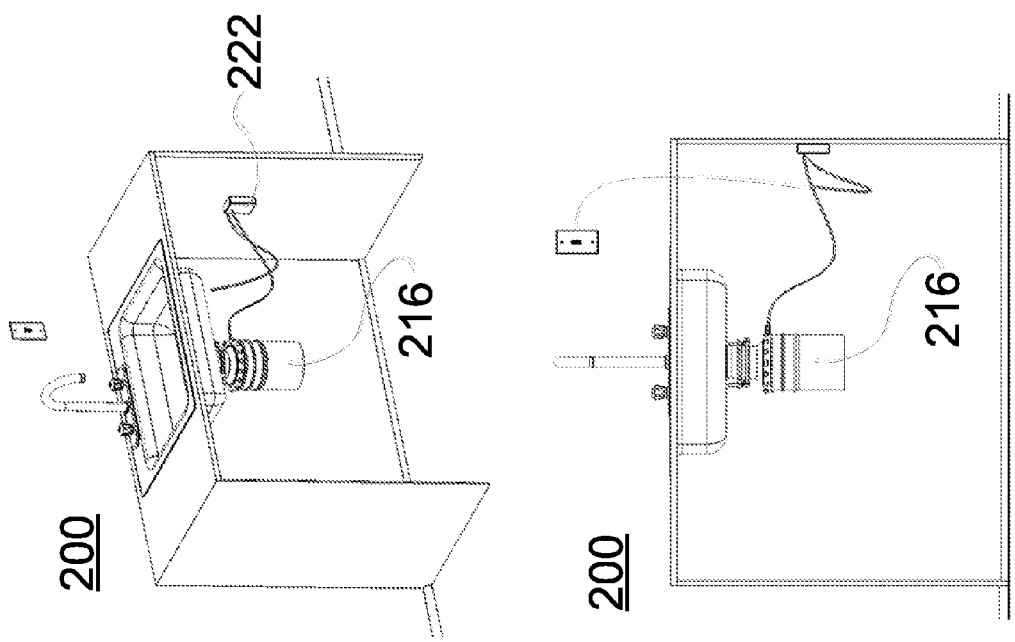
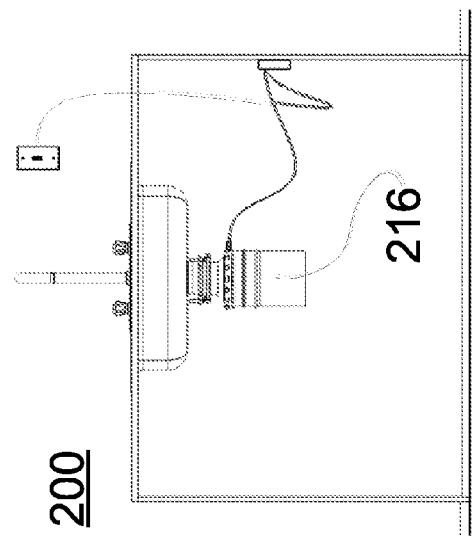

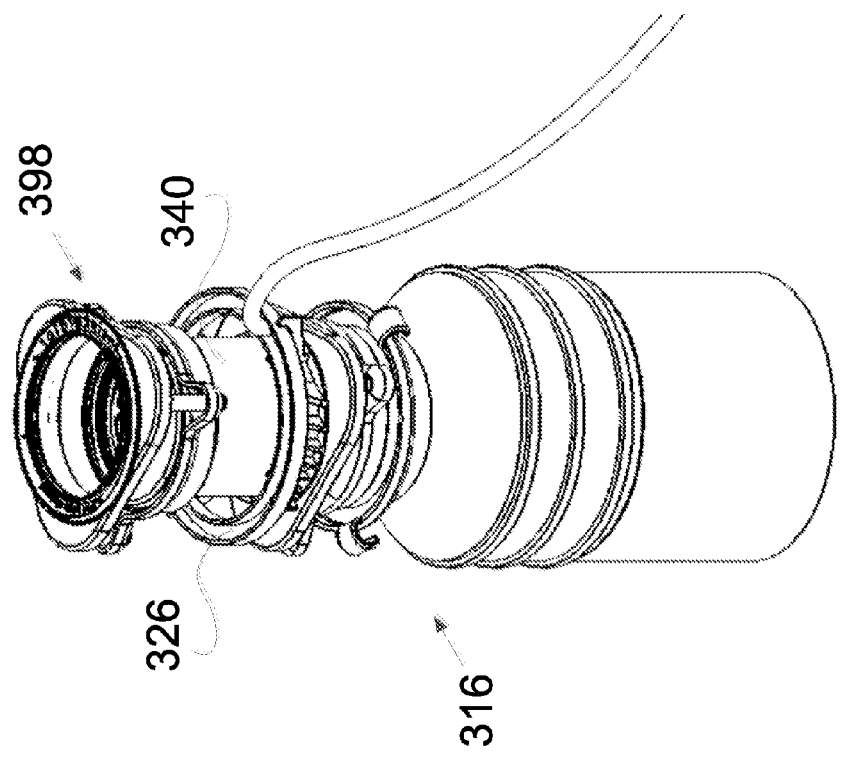
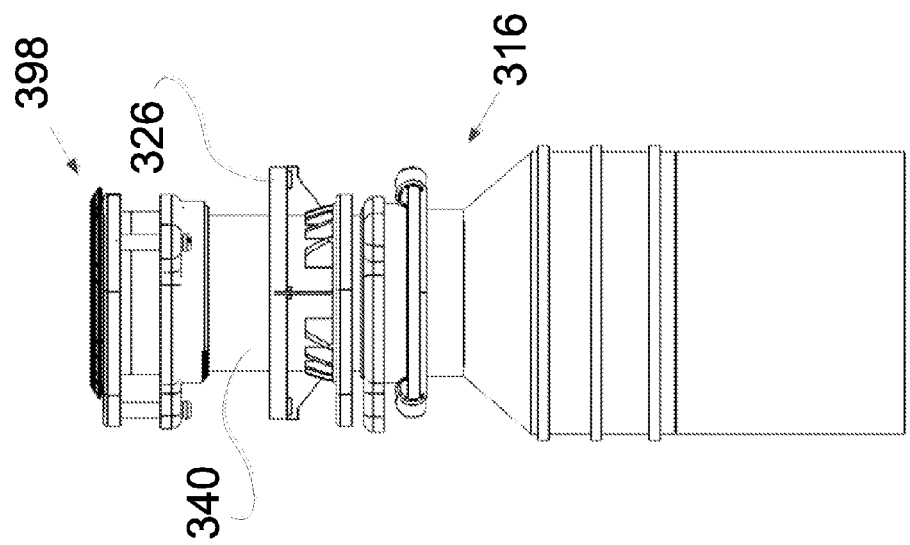

SINK DISPOSAL AND METAL SENSOR

CROSS-REFERENCE TO RELATED APPLICATION

The present application is a U.S. continuation-in-part patent application of, and claims priority under 35 U.S.C. §120 to, U.S. nonprovisional patent application Ser. No. 14/294,120, filed on Jun. 2, 2014, abandoned, which '120 application is incorporated by reference herein, and which '120 application is a U.S. continuation patent application of, and claims priority under 35 U.S.C. §120 to, U.S. nonprovisional patent application Ser. No. 13/843,231, filed on Mar. 15, 2013, now U.S. Pat. No. 8,740,115, which '231 application and said patent issuing therefrom are incorporated by reference herein, and which '231 application is a nonprovisional patent application of, and claims priority under 35 U.S.C. §119(e) to, U.S. provisional patent application 61/637,270, filed Apr. 23, 2012, which provisional patent application is incorporated by reference herein. The present application also is a nonprovisional patent application of, and claims priority under 35 U.S.C. §119(e) to, U.S. provisional patent application 62/036,108, filed Jun. 2, 2014, which provisional patent application is incorporated by reference herein. A copy of the disclosure of the '270 provisional application and a copy of the disclosure of the '108 provisional application both are contained in the Appendix, which is incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to under-sink disposals. Such disposals are commonly found in most U.S. homes, and are designed to shred organic material prior to entering a sewer system. They are not designed to handle bottle caps, jar lids, or utensils such as a knife, fork, or spoon, let alone the occasional piece of jewelry, such as a wedding ring. Indeed, when such items are inadvertently dropped or otherwise fall into the disposal, the disposal breaks, the item is damaged or destroyed, or both.

In view of this, it is believed that a need exists for improvement in under-sink disposals in order to address the situation in which a utensil or other metallic object is accidentally dropped into or otherwise inadvertently enters the disposal. This and other needs are addressed by one or more aspects and features of the present invention.

SUMMARY OF THE INVENTION

The present invention generally relates to in-sink disposal apparatus and methods.

In an aspect of the present invention, an apparatus includes: a disposal unit; a control unit configured to stop operation of the disposal unit; and a metal detector coil and associated circuitry, the metal detector coil located such that waste passing into the disposal unit for shredding passes through the metal detector coil. The control unit is triggered to stop operation of the disposal unit upon the detection of metal passing through the metal detector coil.

In a feature of this aspect, the control unit comprises a magnetic coupling switch with associated control circuitry.

In a feature of this aspect, the control unit turns off power to the disposal.

In a feature of this aspect, the control unit causes active braking of the shredding mechanism of the disposal, including any blades thereof, such that the disposal stops functioning faster than if power were merely turned off to the disposal.

In a feature of this aspect, the apparatus further comprises a braking component attached to the disposal unit. Preferably, the control unit causes active braking of the shredding mechanism of the disposal unit by wirelessly transmitting a control signal to a braking component attached to the disposal unit.

In a feature of this aspect, the metal detector coil is housed within a collar that is fitted around an upper portion of the housing of the disposal unit.

In a feature of this aspect, the metal detector coil is housed within a collar that is fitted around a pipe that extends between the disposal unit and a sink drain.

In a feature of this aspect, the metal detector coil is housed within a collar that is fitted around a neck of a disposal unit.

In a feature of this aspect, the metal detector coil is located at an entry point of material into the disposal unit and does not detect when a metallic is at the point of shredding within the disposal unit but, instead, detects when the metallic object is entering the disposal unit prior to attempted shredding of the metallic object.

In a feature of this aspect, the metal detector coil is integrated into a housing of the disposal unit.

In a feature of this aspect, the metal detector circuitry is housed in the control unit.

In a feature of this aspect, the apparatus further comprises an indicator for alerting a user when the control unit is triggered and operation of the disposal is stopped.

The indicator may comprises a warning light; a buzzer; a speaker; a vibrating component that is configured to provide a vibratory alert; and any combination thereof. The indicator may be controlled through wireless or wired electronic communications.

In a feature of this aspect, the indicator is a self-contained wireless device that includes a wireless receive for wireless triggering, by the control unit, of an alert provided by the indicator. The indicator may be configured to be mounted to a base of a faucet or a neck of a faucet, and may be configured to slip onto and off of the faucet.

In another feature, the indicator is configured to be placed within a drain recess of a sink inline with waste traveling from the sink toward the disposal unit.

In another aspect of the invention, an apparatus comprise a combination of an under-sink disposal unit, a metal detector assembly, and a shut-off switch actuated by the metal detector assembly to shut off power supply to the disposal unit upon detection of metal entering the disposal.

In another aspect, a kit for up fitting a convention disposal system to that of the disposal system as shown and described.

In another aspect, a method for safely operating a disposal so as to accommodate the accidental entry of a metallic object into the disposal, whereby the disposal will shut off if on upon detection of the entry of the metallic object, and whereby the disposal will not turn on if a metallic object is detected.

In another aspect, a method for safely operating a disposal so as to accommodate the accidental entry of a metallic object into the disposal, comprising shutting off the disposal upon detecting a metallic object.

In a feature, the method further includes resetting the disposal so as to enable the disposal to be turned back on after a metal object has been detected.

In a feature, the method further includes providing an indication that a metallic object has been detected and that the disposal will not turn on.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings.

FIG. 3 is a perspective view of another under-sink disposal arrangement in accordance with another embodiment of the present invention.

FIG. 4 is a front plan elevational view of the arrangement of FIG. 3.

FIG. 5 is a side plan elevational view of the disposal unit of the arrangement of FIG. 3.

FIG. 7 is a side plan elevational view of the another disposal and collar housing a metal detector coil in accordance with another embodiment of the present invention.

FIG. 8 is a perspective view of the disposal of FIG. 7.

DETAILED DESCRIPTION

Figure 1:
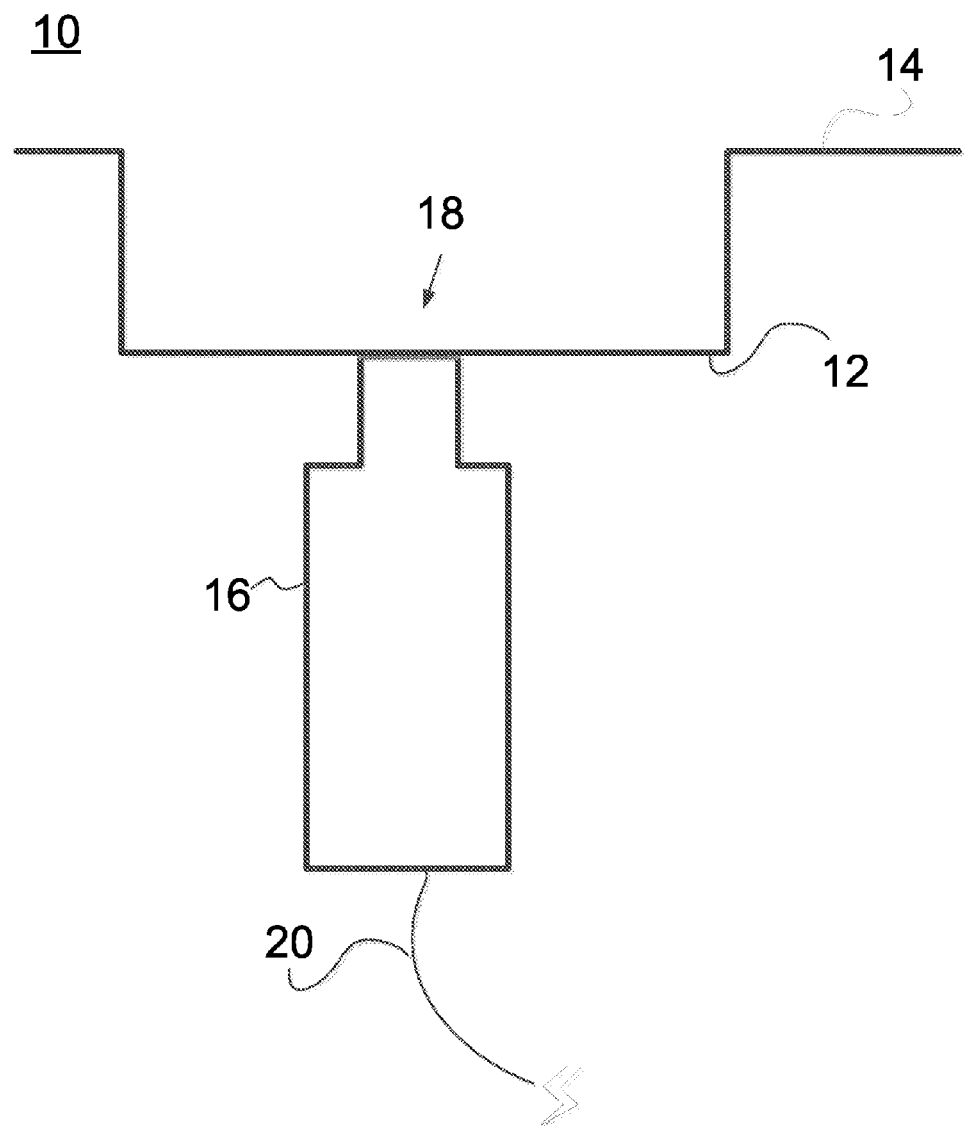
FIG. 1 is a schematic illustration of an arrangement of a conventional under-sink disposal in accordance with the prior art.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Figure 2:
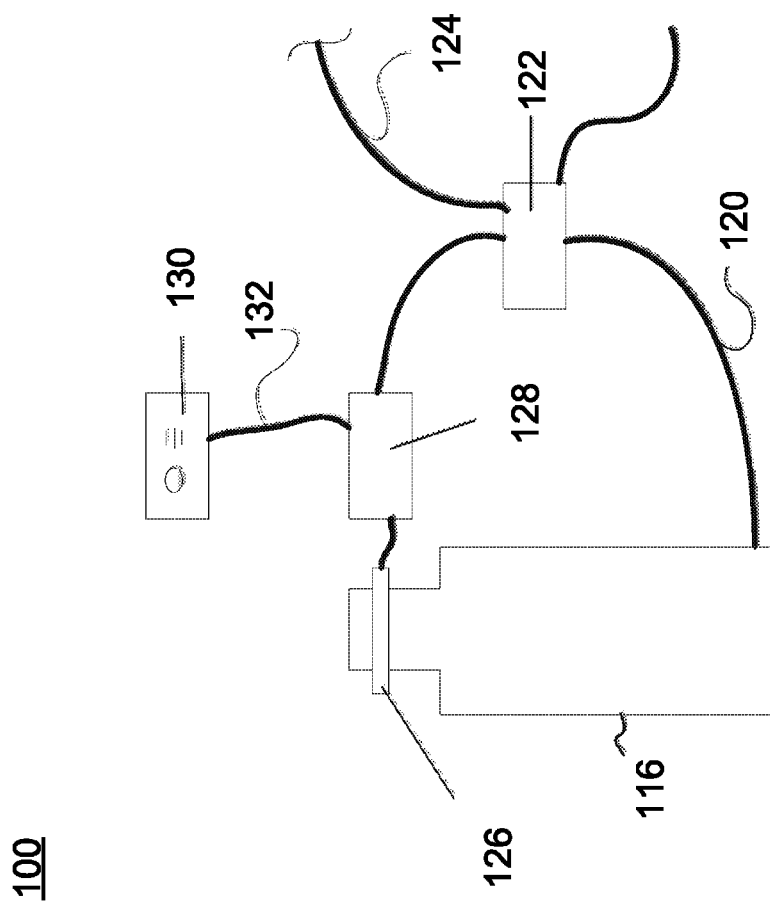
FIG. 2 is a schematic illustration of an under-sink disposal arrangement in accordance with a preferred embodiment of the present invention.

Turning now to the drawings, FIG. 1 is a schematic illustration of a convention under-sink disposal arrangement in accordance with the prior art; and FIG. 2 is a schematic illustration of an under-sink disposal in accordance with a preferred embodiment of the present invention.

As show in FIG. 1, an arrangement of a conventional under-sink disposal 10 comprises a sink 12 installed in a countertop 14 with a disposal 16 mounted under the sink 12. An intake of the disposal 16 is via a drain 18 of the sink 12. The disposal 16 is powered via a power cord 20 connected directly or indirectly to a power source through a conventional outlet.

As shown in FIG. 2, an arrangement of an under-sink disposal in accordance with a preferred embodiment of the invention is shown; however, in FIG. 2 the sink and countertop have been omitted form the illustration for clarity. The arrangement 100 comprises a disposal 116 that is similarly powered via a power cord 120 indirectly connected to a power source through a conventional outlet. In this respect, a control unit 122 is located between the power cord 120 and the power source, from which a secondary power cord or wire 124 extends. The control unit 122 preferably is mounted in the area under the sink. The control unit 122 serves as a kill switch for turning off power to the disposal 116—or otherwise stopping operating of the disposal 116—as will be further described below. The mechanism of the control unit 122 may include, for example, an a magnetic coupling switch with associated control circuitry.

The control unit 122 is triggered by the detection of metal passing into the disposal 116. The metal may be in the form of bottle caps, knives, forks, and even jewelry. The detection of metal is performed using metal detection components, including a metal detector coil 126 and associated metal detector circuitry 128. Furthermore, while shown located in a box separate from the metal detector coil 126 and the control unit 122, it will be appreciated that the metal detector circuitry 128 alternatively may be integrated in a housing containing the metal detector coil 126 or in the control unit 122 itself.

Optionally, at least one indicator also is included for alerting a user when the control unit is triggered and operation of the disposal 112 is blocked. Such an indicator is shown FIG. 2 in the form of a warning light and buzzer device 130. It will be appreciated that the device 130 may include an audible alert component, a visual alert component, or both. The device 130 is preferably mounted to a wall above the countertop surface, such as adjacent a conventional switch for manual operation of the disposal 116. The device 130 is triggered by the metal detector circuitry via wire 132. It will further be appreciated that while wired connections are shown for transmitting signals in the arrangement 100, wireless transmission may be used instead with necessary transmitter and receiver components being included.

In use, the metal detector circuitry 128 determines when metal passes through the metal detector coil 126 and, upon such detection, the metal detector circuitry transmits a signal to the kill switch of the control unit 122 that turns off or disables the disposal 116. In operation, the electric motor of the disposal preferably is immediately shut off if and when any metal passes through the metal detector coil 126 into the disposal 116.

In an exemplary operation, a fork is unintentionally dropped into the intake of the disposal. An above sink warning light turns on and an alarm sounds alerting the operator not to turn on the disposal until the fork is removed; attempting to turn on the disposal will not work, either, as power has been cutoff to the disposal. The disposal is rendered nonfunctional until the fork is removed and the system is reset to indicate the metal has been removed.

In another exemplary operation, a fork is unintentionally dropped into the intake of a running disposal. The warning light turns on and the alarm sounds. In addition, the metal detector sends a signal to the magnetic "kill switch" which will immediately cuts the power to the disposal. This feature eliminates, or at least minimizes, damage to the fork.

From the foregoing description, it will be understood that the disposal is provided with a metal detector coil in the form of a collar that surrounds the intake of the disposal. The metal detector coil is hardwired to metal detector circuitry, which detects when metal comes within proximity to the coil when passing through the coil into the waste area of the disposal where conventional shredding occurs. The coil, or metal sensing device, thus is located at the entry point of material into the disposal and does not detect when metal is at the point of shredding within the disposal but, instead, detects when the metal enters—or is about to enter—the disposal prior to shredding.

In an alternative to being disposed about an intake of the metal detector as represented in FIG. 2, the metal detector coil can be integrated into the housing of the metal detector at the point of entry into the housing. This would be accomplished in an "OEM" version of an arrangement of an in-sink disposal system in accordance with embodiments of the invention. The collar version represented in FIG. 2 may be installed as an aftermarket upgrade to an existing disposal arrangement, and the coil may be contained in a collar housing that fits around an existing intake of a conventional disposal, or may be contained in a collar housing that fits around a pipe extending between the sink drain and disposal.

This is accomplished by breaking the electrical connection of the disposal unit to the power supply, i.e., power to the disposal unit is turned off. The switch may comprise a magnetic switch. Moreover, the switch may reconnect the power once metal is no longer detected by metal detector, or sensor, or the switch once actuated to turn off the power may need to be reset by a user before the disposal may be operated again. This may be accomplished, for example, by actuating a button on the switch to reset it for actuating, again, by the circuitry upon subsequent detection of metal passing into the shredding area of the disposal unit.

Yet another arrangement of an under-sink disposal 200 in accordance with a preferred embodiment of the invention is shown in FIGS. 3, 4, and 5. The arrangement 200 is similar to that described above with reference to the arrangement 100 and includes a disposal unit 216 and metal detector coil 226, wherein the metal detector coil is housed within a collar fitted about the housing of the disposal unit itself. A difference, however, is that the metal detector circuitry (represented at 128 in FIG. 2) is integrated with the control unit 222 in the arrangement 200. Although not preferred, arrangement 200 further shows an embodiment without an indicator.

Figure 6:
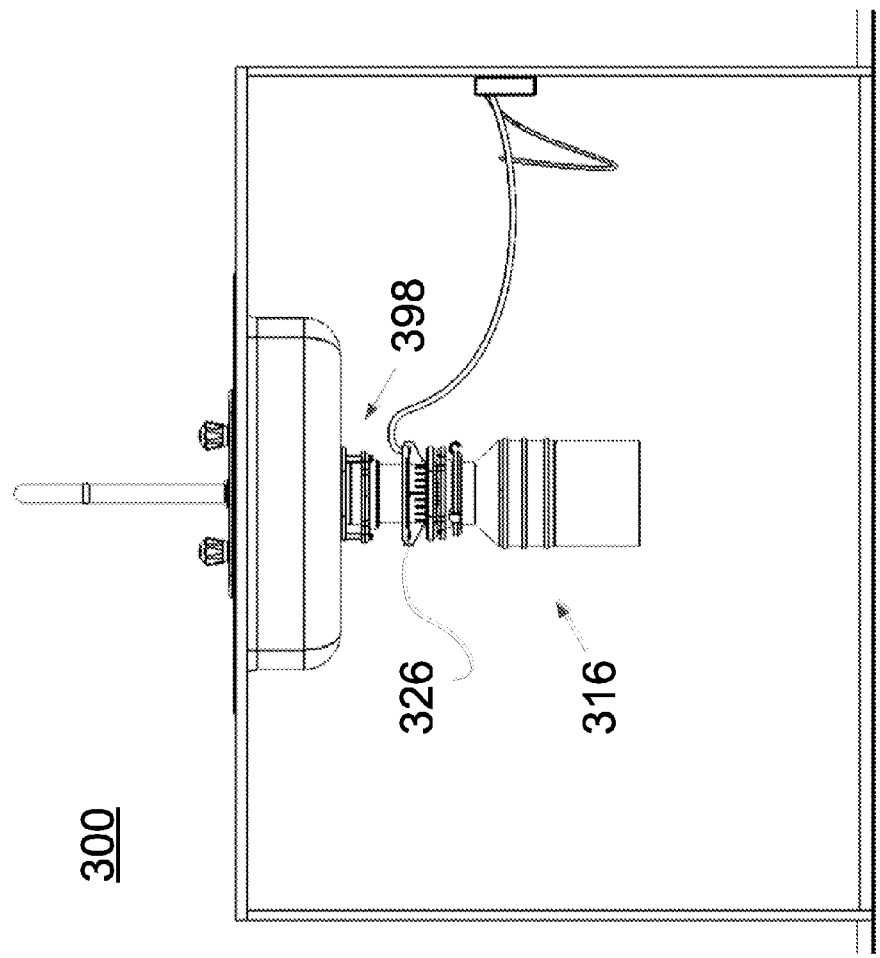
FIG. 6 is a perspective view of another under-sink disposal arrangement in accordance with another embodiment of the present invention.

Another arrangement of an under-sink disposal 300 in accordance with a preferred embodiment of the invention is shown in FIGS. 6, 7, and 8. The arrangement 300 is similar to that described above with reference to the arrangement 200 and includes a disposal unit 316 and metal detector coil 326; however, in 300 the metal detector coil 326 is housed within a collar fitted about a pipe or conduit 340 inserted into and extending between the sink drain and mounting indicated at 342 and the disposal unit 316.

Alert Indicators

As described with reference to FIG. 2, an above sink warning system comprising a light, an audible alarm, or both, is used so as to alert a user that metal has entered the disposal. The device is preferably mounted on a wall above the countertop, perhaps next to a switch for manual operation of the disposal. Other alternative indicators are show in FIGS. 9, 10, 11, and 12.

Figure 10:
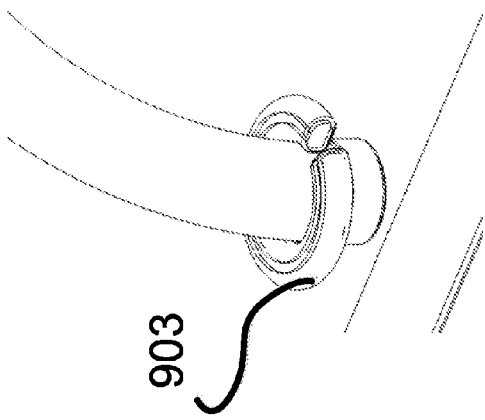
FIG. 10 is a perspective view of an indicator attached to a neck of a faucet in accordance with another embodiment of the present invention.
Figure 9:
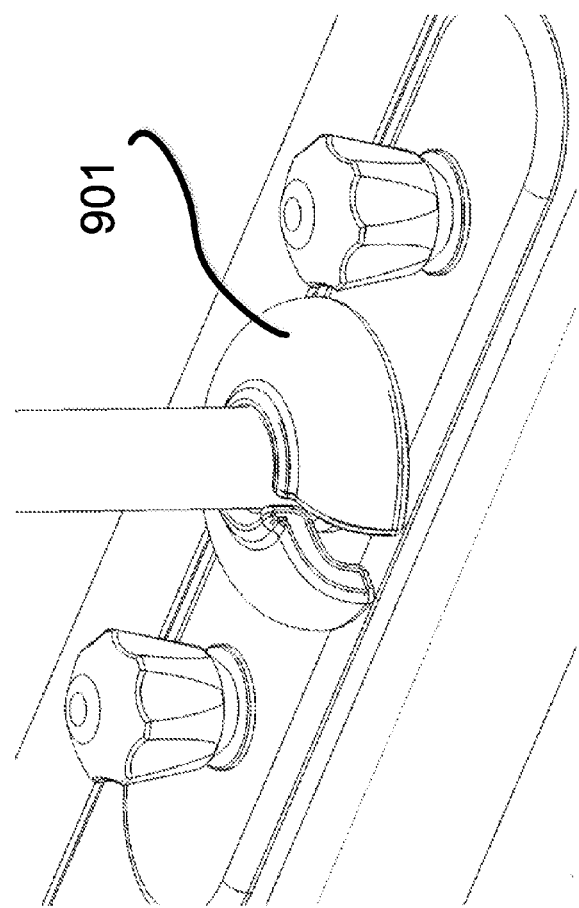
FIG. 9 is a perspective view of an indicator attached to a base of a faucet in accordance with another embodiment of the present invention.
Figure 11:
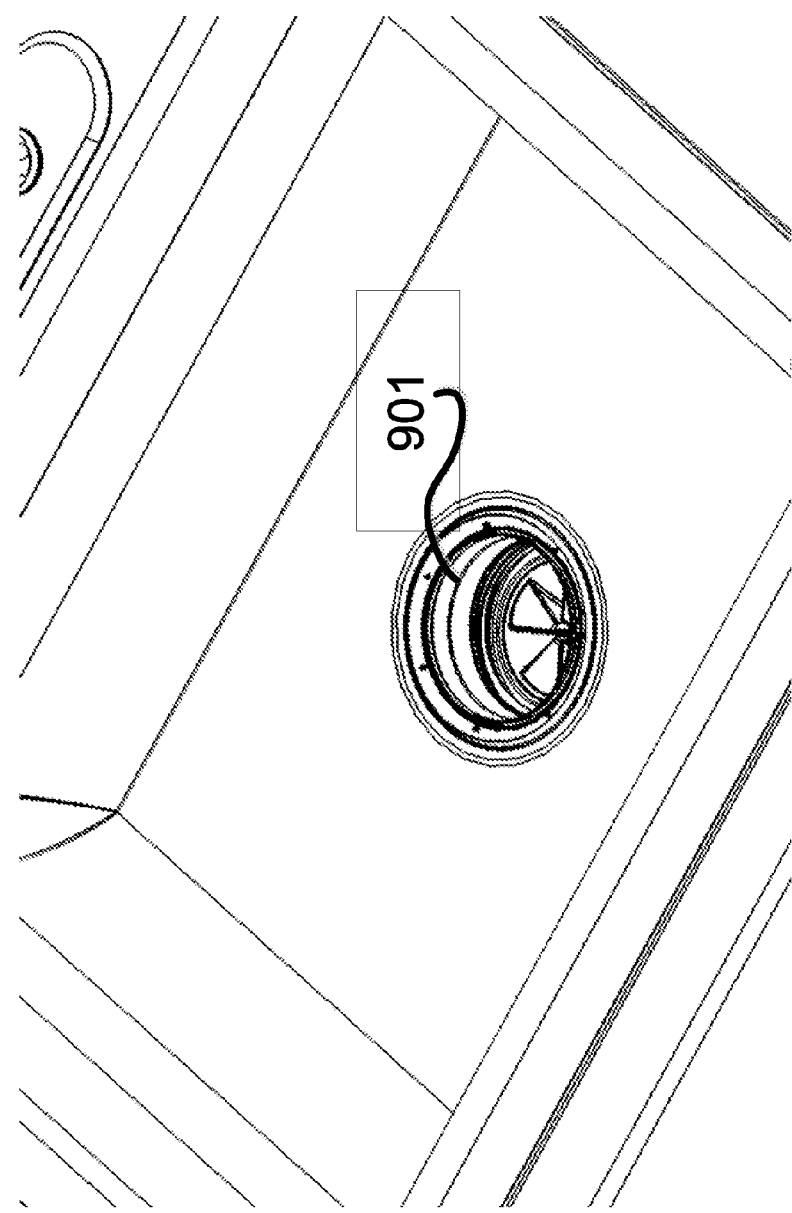
FIG. 11 is a perspective view of an indicator located in a sink drain in accordance with another embodiment of the present invention.
Figure 12:
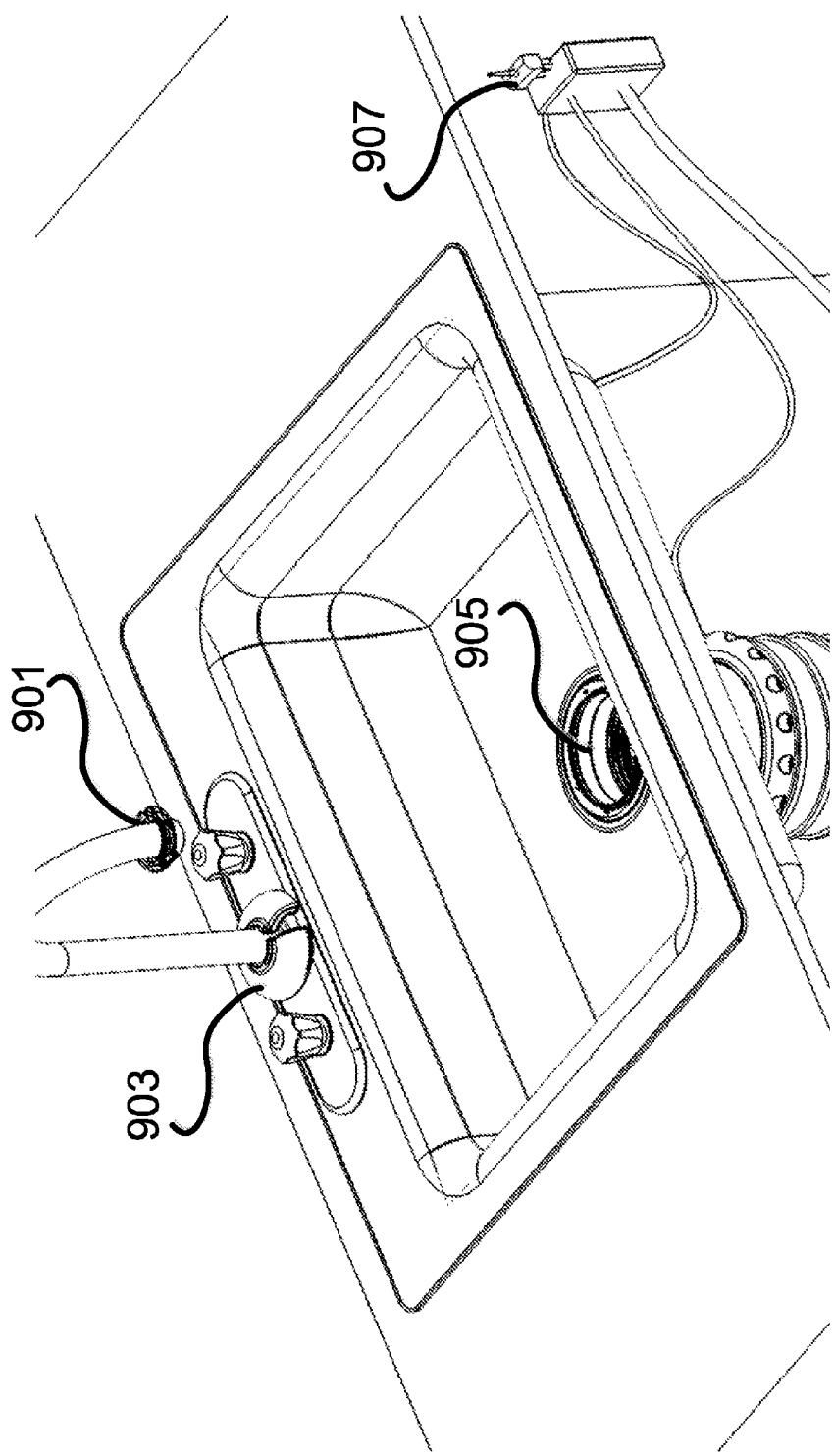
FIG. 12 is a perspective view of an under-sink disposal arrangement in accordance with another embodiment of the present invention in which the indicators of FIGS. 9, 10, and 11 are utilized.

In this respect, in FIG. 12 an indicator 901 is shown attached to the base of a conventional faucet of the sink; an indicator 903 is shown attached to a neck of the faucet; and an indicator 905 is shown inserted into a drain recess. The indicator 901 is further shown in FIG. 9, and comprises a wireless receiver for being triggered wirelessly. The indicator 903 is shown in FIG. 10 and also preferably is wireless, but may be wired. The indicator 905 also is preferably wireless and further is shown in FIG. 11 in its location within the base of the sink and in an orientation that is inline with the waste passage down the drain.

Additionally, the control unit shown in FIG. 12 is illustrated as including an external wireless transceiver 907 for triggering the indicators preferably to light up, when appropriate, so as to indicate a state of the system in which a metallic item passing into the disposal is indicated to have been detected. Still further, the wireless transceiver 907 can be used for receiving a triggering signal from the metal detector circuitry when metal is detecting passing through the metal detector coil.

In addition thereto, the switch for manually activating the disposal can include a lighting element for visually indicating the state of the system, including red or arrange for deactivated (metal detected); and green (ready for operation). Of course, any desired combination of colors can be used to indicate states of the system.

Kit Embodiments

Another embodiment of the invention comprises a kit for up fitting convention disposal units. The kit preferably comprises a sleeve that is installed between a sink and a disposal intake section. The sleeve contains the sensor coil of the metal detector assembly for detecting metal passing through the intake of the disposal unit. The kit includes an alarm and a warning light device with a magnetic switch that turns the disposal off when metal is passes through the sleeve containing the coil. The magnetic switch is wired to the existing power supply to the disposal during installation of the kit.

Advanced Breaking

In the foregoing description, turning off or cutting power to the disposal results in the disposal ceasing operation, similar to when a manual switch is moved to an off position form an on position. In alternative embodiments, a braking mechanism is provided that stops the disposal faster, whereby the disposal may be stopped when the metal passing through the metal detector coil actually advances to the bottom of the disposal chamber where shredding occurs.

Such braking can be accomplished through dynamic braking by the control box, in which DC electrical current is passed through the AC disposal unit causing it to rapidly slow down.

Figure 13:
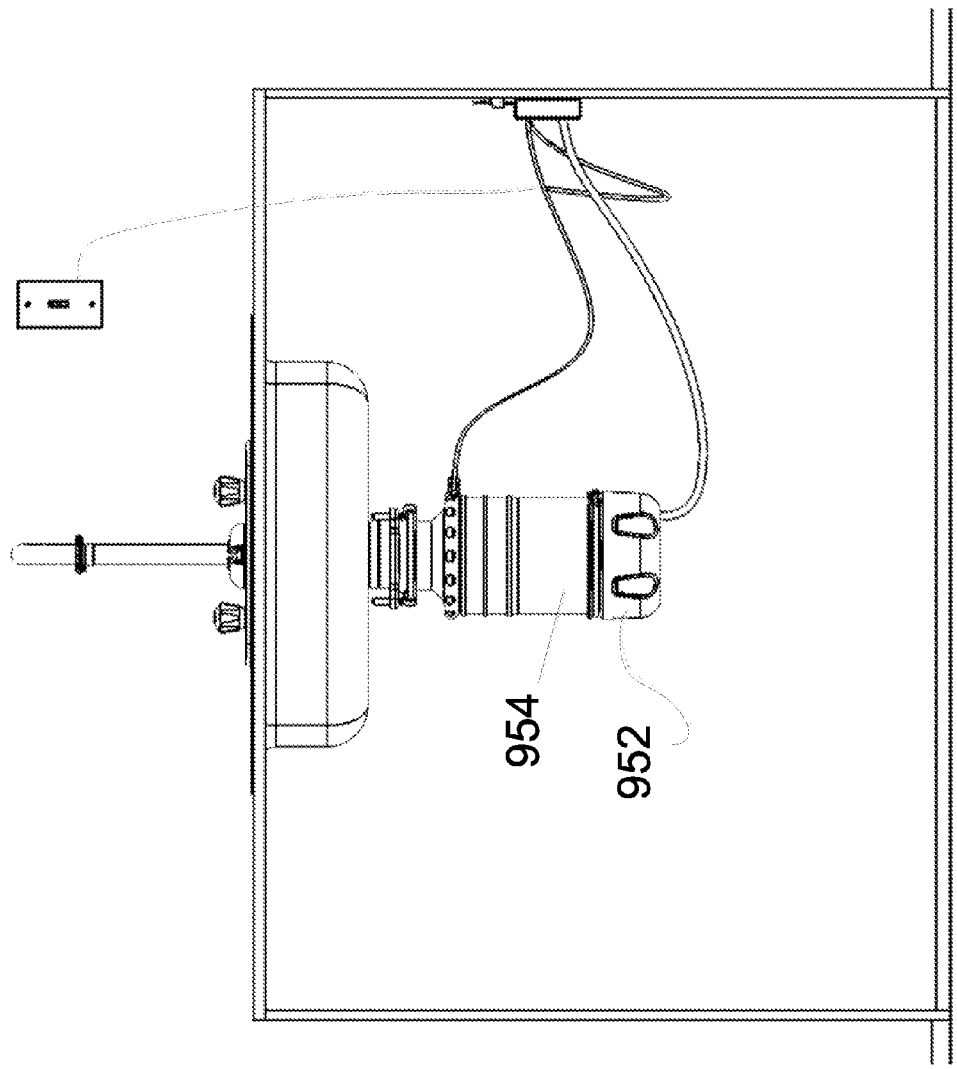
FIG. 13 is a front plan elevational view of an under-sink disposal arrangement in accordance with another embodiment of the present invention in which a braking component is attached to a bottom of the disposal unit and is controlled by the control unit for braking of the disposal shredding mechanism when metal passing through the metal detector coil is detected.

Alternatively, such braking can be provided by using a braking component 952 attached to the bottom of the disposal unit 954 as shown in FIG. 13, which braking component interacts with the conventional preexisting hexagonal keyway in the base of the disposal. Such braking component can be an interference toothed brake in the form of an activated clutch or a padded brake. The control unit preferably would activate the braking component in such embodiments, and is illustrated having a wired connection in FIG. 13 to the breaking component although such connection can be wireless. The braking component can comprise a clutch or toothed braking.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

For example, while visual and audible alarm or alert indicators have been described above, vibratory alerts may also be provided in an indicator as the sole alert mechanism or in addition to one or more visual and audible alert mechanisms.

In another variation within the scope of the present invention, the arrangement further includes an electromagnet arranged and located below the metal detector coil so as to attract and trap metal objects passing through the metal detector coil. Upon detection of metal passing through the metal detector coil, the control unit energizes the electromagnet to attract and capture.

What is claimed is:

1. An under-sink disposal system, comprising:
   (a) a sink installed in a countertop;
   (b) a disposal mounted under the sink and comprising a shredding mechanism for shredding waste received from the sink that enters into a shredding area of the disposal, with a fluid passageway extending from a drain of the sink for passing of waste to the shredding area of the disposal;
   (c) a control unit operatively connected to the disposal and configured to inhibit shredding operation of the disposal; and
   (d) a metal sensor and associated circuitry, the metal sensor being located adjacent the fluid passageway such that a metallic object passing through the fluid passageway toward the shredding area of the disposal is detected by the metal sensor;

(e) wherein the control unit is operatively connected to the circuitry associated with the metal sensor such that the control unit inhibits shredding operation of the disposal upon the detection of a metallic object passing through the fluid passageway toward the shredding area of the disposal, including, (i) stopping shredding operation of the disposal when running, upon detection of a metallic object passing through the fluid passageway toward the shredding area of the disposal, and (ii) preventing shredding operation of the disposal from starting after the detection of a metallic object passing through the fluid passageway toward the shredding area of the disposal.

2. The under-sink disposal system of claim 1, wherein the circuitry associated with the metal sensor is housed in the control unit.

3. The under-sink disposal system of claim 1, wherein the control unit comprises a switch.

4. The under-sink disposal system of claim 1, wherein the control unit turns power off to the disposal.

5. The under-sink disposal system of claim 1, wherein the metal sensor comprises a metal detector coil.

6. The under-sink disposal system of claim 1, further comprising an indicator for alerting a user when the control unit is inhibiting shredding operation of the disposal.

7. The under-sink disposal system of claim 6, wherein the indicator is wirelessly activated by the control unit.

8. The under-sink disposal system of claim 7, wherein the indicator is a self-contained wireless device that includes a wireless receiver for wirelessly triggering, by the control unit, of an alert provided by the indicator.

9. The under-sink disposal system of claim 6, wherein the indicator is mounted to a faucet of the sink.

10. The under-sink disposal system of claim 9, wherein the indicator is disposed about a neck of the faucet.

11. The under-sink disposal system of claim 6, wherein the indicator is disposed within a recess of the drain of the sink such that waste passing from the sink into the fluid passageway passes through in the indicator.

12. The under-sink disposal system of claim 1, further comprising a braking component attached to a bottom of the disposal.

13. The under-sink disposal system of claim 12, wherein, upon detection of a metallic object passing through the fluid passageway toward the shredding area of the disposal, the control unit activates the braking component to cause active braking of the shredding mechanism of the disposal such that shredding operation of the disposal stops faster than if power were merely turned off to the disposal.

14. The under-sink disposal system of claim 12, wherein the control unit wirelessly activates the braking component.

15. The under-sink disposal system of claim 1, further comprising an electromagnet arranged and located below the metal sensor and configured to attract and trap, when energized, metallic objects passing the metal sensor.

16. The under-sink disposal system of claim 15, wherein the control unit energizes the electromagnet upon detection of a metallic object passing through the fluid passageway toward the shredding area of the disposal.

17. A method for safely operating an under-sink disposal so as to accommodate the accidental entry of a metallic object into the disposal, comprising the steps of:

(a) using a metal sensor and associated circuitry, monitoring for a metallic object passing through a fluid passageway extending from a sink toward a shredding area of the disposal, the metal sensor being located adjacent the fluid passageway;

(b) upon detecting the passing of a metallic object through the fluid passageway from the sink toward the shredding area of the disposal, (i) inhibiting shredding operation of the disposal by, (A) stopping shredding operation of the disposal, if running, upon the detection of the passing of the metallic object through the fluid passageway toward the shredding area of the disposal, and (B) preventing shredding operation of the disposal from starting upon the detection of the passing of the metallic object through the fluid passageway toward the shredding area of the disposal, and (ii) alerting a user when the shredding operation of the disposal is being inhibited by wirelessly activating an indicator.

18. The method of claim 17, comprising a preliminary step of mounting the indicator to a faucet of the sink.

19. The method of claim 17, comprising a preliminary step of slipping the indicator onto a faucet of the sink.

20. The method of claim 17, comprising a preliminary step of placing the indicator within a recess of a drain of the sink such that waste passing from the sink into the fluid passageway passes through the indicator.

* * * * *